June 30, 1942.    E. L. CRANDELL    2,288,269
ELECTROSTATIC HEATING APPARATUS
Filed June 4, 1941
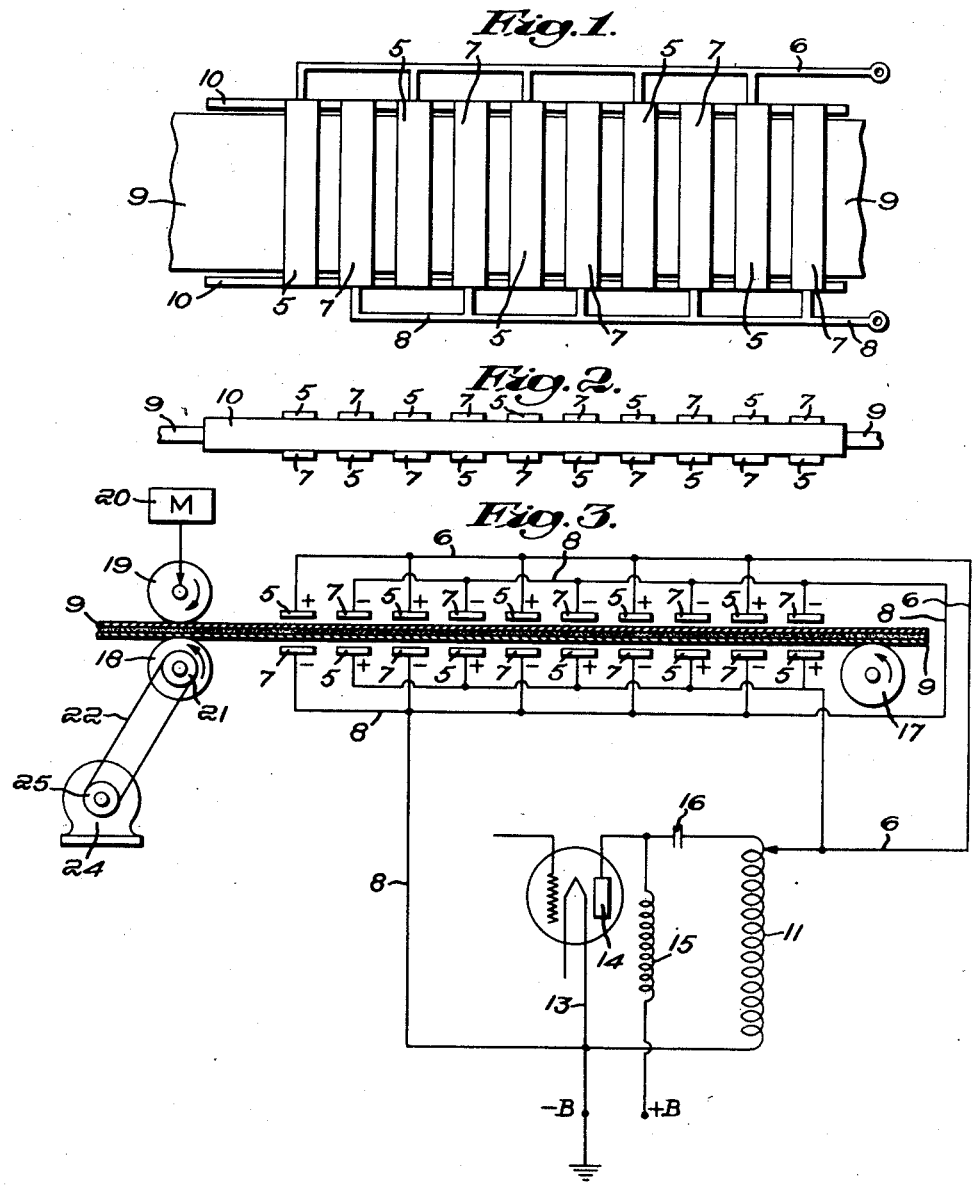
Inventor:
Erwin L. Crandell,
by Robert J. Palmer
Attorney Patented June 30, 1942

2,288,269

UNITED STATES PATENT OFFICE 2,288,269

ELECTROSTATIC HEATING APPARATUS

Ervin L. Crandell, Wellesley, Mass., assignor to Compo Shoe Machinery Corporation, Boston, Mass., a corporation of Delaware Application June 4, 1941, Serial No. 396,593

12 Claims. (Cl. 219—47)

This invention relates to apparatus for the production of heat through electrostatic energy, and relates more particularly to apparatus for bonding plies of material together utilizing high frequency electrostatic energy for the production of heat thereon.

In utilizing electrostatic energy for the production of heat in the adhesive used for cementing parts of an article together, it is the general practice to utilize a single plate electrode on each side of the work and to connect the electrodes to opposite sides of a high frequency electric source. The Pitman Patent No. 2,087,480 discloses electrodes so arranged.

This invention provides a plurality of relatively small, spaced, plate type electrodes arranged edge to edge on one side of the work, with a plurality of similar electrodes on the other side of the work and arranged parallel to and positioned opposite the other electrodes. Alternates of the electrodes on each side of the work are connected to opposite sides of a high frequency electric source with the corresponding electrodes on the opposite sides of the work being oppositely charged. With this arrangement electrostatic fields are set up between adjacent electrodes on both sides of the work, the fields so produced extending through the work to produce heat therein. Electrostatic fields are also produced between the corresponding electrodes on opposite sides of the work. Thus a plurality of electrostatic fields having lines of force extending through the work are utilized.

With such an electrode arrangement, the fields between the opposed electrodes need not be so intense as formerly, resulting in reduced danger of arcs and resulting burns. Furthermore the electrodes on either side of the work surface may be used independently as where it may be desired to produce more heat nearer one surface than the other.

An object of the invention is to increase the number of electrostatic fields in work surfaces.

The invention will now be described with reference to the drawing, of which:

Fig. 1 is a plan view looking downwardly upon the upper of a set of electrodes in an electrode arrangement embodying this invention;

Fig. 2 is a side elevation of the electrodes of Fig. 1 and illustrates the arrangement of the lower electrodes as well as the upper ones, and Fig. 3 is a diagrammatic view illustrating electrodes according to this invention connected to a high frequency electric oscillator and illustrating the application of the invention in a machine for bonding plies together.

Referring first to Figs. 1 and 2, the spaced plate electrodes 5 are arranged along a horizontal line and are interconnected by the electric conductor 6 which also serves to connect the electrodes to one side of a high frequency electric source. Interlaced with the electrodes 5 are the similar electrodes 7 which are interconnected by the electric conductor 8 which is also used to connect the electrodes 7 to the opposite side of the high frequency electric source.

As illustrated by Fig. 2, duplicate sets of electrodes 5 and 7 are arranged on the lower side of the work strip, the electric insulators 10 serving to space the oppositely placed electrodes apart and to support them.

The lower electrodes 7 are placed below and in alignment with the upper electrodes 5, and the lower electrodes 5 are placed below and in alignment with the upper electrodes 7.

As illustrated by Fig. 3, the electrodes 5 are connected by the conductor 6 to the live side of the oscillator tank coil 11 and the electrodes 7 are connected by the conductor 8 to the ground side of the tank coil.

The oscillator circuit is a conventional one and includes a vacuum tube triode having its cathode 13 connected to the negative side of a suitable high potential direct current source, and having its anode 14 connected through the radio frequency choke 15 to the positive side of the direct current source. The tank coil 11 is connected at one end through the blocking condenser 16 to the anode 14 and is connected at its other end to the cathode 13 and to ground.

The work strip 9 which may be laminated plywood or other material having plies with adhesive therebetween is positioned on the rollers 17 and 18. The roller 19 is urged downwardly by the mass 20 to exert pressure on the roller 19 to cause it to compress the work strip 9 between the rollers 18 and 19.

The roller 18 has the pulley 21 which is rotated by the belt 22 which rides on the pulley 25 of the electric motor 24. The pulley 18 thus is rotated to advance the work strips between the upper and lower electrodes.

The oscillator is operated at a frequency which may, for example, be 20 megacycles and acts to produce electrostatic fields between the opposed electrodes 5 and 7 and between the adjacent electrodes 5 and 7. The fields between the upper electrodes 5 and 7 bow downwardly through the work strip, and the fields between the lower electrodes 5 and 7 bow upwardly through the work strip.

Maximum heat, produced as described in said Pitman patent, results when all electrodes are active as illustrated by Fig. 3. Either the upper electrodes or the lower electrodes may be disconnected and the apparatus operated at reduced capacity. The fields between the adjacent electrodes which are energized, then produce heat in the work strip. The apparatus may be so operated when, for example, it is desirable to concentrate the heat near a surface of the work strip.

The heat from the electric fields activates the adhesive between the plies and the cementing is completed by the pressure between the rollers 18 and 19.

The invention is capable of other uses than cementing plies together with adhesives. For example, the plies may be of plastic material which itself is softened by the application of the heat from the electrostatic field with the bonding completed by the application of pressure.

In the annexed claims where plies or adhesives are mentioned, they are defined as having dielectric qualities which will cause them to become heated in high frequency electrostatic fields as described in said Pitman patent.

While one embodiment of the invention has been described for the purpose of illustration, it should be understood that the invention is not limited to the exact apparatus and arrangements of apparatus illustrated, as modifications thereof may be suggested by those skilled in the art without departure from the essence of the invention.

What is claimed is:

1. Electrostatic heating apparatus comprising a first plurality of electrodes arranged substantially in edge to edge alignment and adapted to be placed at one side of a work surface; a second plurality of electrodes arranged substantially in edge to edge alignment and adapted to be placed on another side of said work surface; means forming a high frequency, electric oscillator circuit, and means connecting alternate electrodes of said first plurality to opposite sides of said circuit and electrodes of said second plurality to the other side of said circuit.

2. Electrostatic heating apparatus comprising a first plurality of electrodes arranged substantially in edge to edge alignment and adapted to be placed at one side of a work surface; a second plurality of electrodes arranged substantially in edge to edge alignment and adapted to be placed on the opposite side of said work surface; means forming a high frequency, electric oscillator circuit; means connecting alternate electrodes of said first plurality of electrodes to opposite sides of said circuit, and means connecting electrodes of said second plurality to one side of said circuit.

3. Electrostatic heating apparatus comprising a first plurality of electrodes arranged substantially in edge to edge alignment and adapted to be placed at one side of a work surface; a second plurality of electrodes arranged substantially in edge to edge alignment and adapted to be placed on the opposite side of said work surface; means forming a high frequency, electric oscillator circuit; means connecting alternate electrodes of said first plurality of electrodes to opposite sides of said circuit; means connecting electrodes of said second plurality to one side of said circuit, and means connecting electrodes of said second plurality alternate to said last mentioned electrodes, to the other side of said circuit.

4. Electrostatic heating apparatus comprising a first plurality of electrodes arranged substantially in edge to edge alignment and adapted to be placed at one side of a work surface; a second plurality of electrodes arranged substantially in edge to edge alignment and adapted to be placed on another side of said work surface, said first and said second plurality having corresponding electrodes in substantial alignment; means forming a high frequency, electric oscillator circuit, and means connecting alternate electrodes of said first plurality to opposite sides of said circuit and electrodes of said second plurality to the other side of said circuit.

5. Electrostatic heating apparatus comprising a first plurality of electrodes arranged substantially in edge to edge alignment and adapted to be placed at one side of a work surface; a second plurality of electrodes arranged substantially in edge to edge alignment and adapted to be placed on the opposite side of said work surface, said first and said second plurality having corresponding electrodes in substantial alignment; means forming a high frequency, electric oscillator circuit; means connecting alternate electrodes of said first plurality of electrodes to opposite sides of said circuit, and means connecting electrodes of said second plurality to one side of said circuit.

6. Electrostatic heating apparatus comprising a first plurality of electrodes arranged substantially in edge to edge alignment and adapted to be placed at one side of a work surface; a second plurality of electrodes arranged substantially in edge to edge alignment and adapted to be placed on the opposite side of said work surface, said first and said second plurality having corresponding electrodes in substantial alignment; means forming a high frequency, electric oscillator circuit; means connecting alternate electrodes of said first plurality of electrodes to opposite sides of said circuit; means connecting electrodes of said second plurality to one side of said circuit and means connecting electrodes of said second plurality alternate to said last mentioned electrodes, to the other side of said circuit.

7. Electrostatic heating apparatus comprising a first plurality of electrodes arranged substantially in edge to edge alignment and adapted to be placed at one side of a work surface; a second plurality of electrodes arranged substantially in edge to edge alignment and adapted to be placed on the opposite side of said work surface, said first and said second plurality having corresponding electrodes in substantial alignment; means forming a high frequency, electric oscillator circuit; means connecting alternate electrodes of said first plurality of electrodes to opposite sides of said circuit, and means connecting alternate electrodes of said second plurality to opposite sides of said circuit, corresponding electrodes of said pluralities being connecting to opposite sides of said circuit.

8. Electrostatic heating apparatus comprising a first plurality of electrodes arranged substantially in edge to edge alignment and adapted to be placed at one side of a work surface; a second plurality of electrodes arranged substantially in edge to edge alignment and adapted to be placed on another side of said work surface, said first and said second plurality having corresponding electrodes in substantial alignment; means forming a high frequency, electric oscillator circuit; means connecting alternate electrodes of said first plurality of electrodes to opposite sides of said circuit; means connecting electrodes of said second plurality to one side of said circuit, and means connecting electrodes of said second plurality alternate to said last mentioned electrodes, to the other side of said circuit.

9. Electrostatic heating apparatus comprising a first plurality of electrodes arranged substantially in edge to edge alignment and adapted to be placed at one side of a work surface; a second plurality of electrodes arranged substantially in edge to edge alignment and adapted to be placed on another side of said work surface, said first and said second plurality having corresponding electrodes in substantial alignment; means forming a high frequency, electric oscillator circuit; means connecting alternate electrodes of said first plurality of electrodes to opposite sides of said circuit; means connecting electrodes of said second plurality to one side of said circuit, and means connecting alternate electrodes of said second plurality, to said last mentioned electrodes, to opposite sides of said circuit, corresponding electrodes of said pluralities being connected to opposite sides of said circuit.

10. Electrostatic heating apparatus comprising a first plurality of electrodes arranged edge to edge and adapted to be placed at one side of a work surface; a second plurality of electrodes arranged substantially in edge to edge alignment and adapted to be placed on the opposite side of said work surface; means forming a high frequency, electric oscillator circuit; means connecting alternate electrodes of said first plurality of electrodes to opposite sides of said circuit, and means connecting electrodes of said second plurality to one side of said circuit.

11. Electrostatic heating apparatus comprising a first plurality of electrodes arranged edge to edge and adapted to be placed at one side of a work surface; a second plurality of electrodes arranged substantially in edge to edge alignment and adapted to be placed on the opposite side of said work surface; means forming a high frequency, electric oscillator circuit; means connecting alternate electrodes of said first plurality of electrodes to opposite sides of said circuit; means connecting electrodes of said second plurality to one side of said circuit, and means connecting electrodes of said second plurality alternate to said last mentioned electrodes, to the other side of said circuit.

12. Electrostatic heating apparatus comprising a first plurality of electrodes arranged edge to edge and adapted to be placed at one side of a work surface; a second plurality of electrodes arranged substantially in edge to edge alignment and adapted to be placed on the opposite side of said work surface, said first and said second plurality having corresponding electrodes in substantial alignment; means forming a high frequency, electric oscillator circuit; means connecting alternate electrodes of said first plurality of electrodes to opposite sides of said circuit, and means connecting electrodes of said second plurality to one side of said circuit.

ERVIN L. CRANDELL.